United States Patent
Thakkar

(10) Patent No.: US 11,799,841 B2
(45) Date of Patent: *Oct. 24, 2023

(54) PROVIDING INTERCOMMUNICATION WITHIN A SYSTEM THAT USES DISPARATE AUTHENTICATION TECHNOLOGIES

(71) Applicant: Oracle International Corporation, Redwood Shores, CA (US)

(72) Inventor: Dhiraj D. Thakkar, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 288 days.

This patent is subject to a terminal disclaimer.

(21) Appl. No.: 17/132,931

(22) Filed: Dec. 23, 2020

(65) Prior Publication Data

US 2021/0119985 A1  Apr. 22, 2021

Related U.S. Application Data

(63) Continuation of application No. 16/420,049, filed on May 22, 2019, now Pat. No. 10,911,426, which is a continuation of application No. 15/473,502, filed on Mar. 29, 2017, now Pat. No. 10,348,713.

(60) Provisional application No. 62/395,991, filed on Sep. 16, 2016.

(51) Int. Cl.
   *H04L 9/40* (2022.01)

(52) U.S. Cl.
   CPC .............. *H04L 63/08* (2013.01); *H04L 63/06* (2013.01); *H04L 63/0807* (2013.01)

(58) Field of Classification Search
   CPC .......... H04L 63/08; H04L 63/06; H04L 63/08; H04L 63/0807
   USPC .......................................................... 726/4
   See application file for complete search history.

(56) References Cited

U.S. PATENT DOCUMENTS

| 7,233,997 B1* | 6/2007 | Leveridge ........... H04L 63/0815 709/219 |
| 7,793,340 B2 | 9/2010 | Klester |
| 7,861,082 B2* | 12/2010 | Pinder .............. H04N 21/42684 713/168 |

(Continued)

OTHER PUBLICATIONS

Kerberos (see Wikipedia) (https://en.wikipedia.org/wiki/Kerberos_(protocol))—8 pages.

(Continued)

*Primary Examiner* — Amare F Tabor
(74) *Attorney, Agent, or Firm* — Trellis IP Law Group, PC

(57) ABSTRACT

A custom client authenticator is installed on non-server entity. The custom client authenticator authorizes communication between a client application of a client and requested entities of a server. A native authentication technology for the client is different than a native authentication technology for the server. The custom client authenticator is registered in a descriptor file that is accessible by the server. The custom client authenticator generates an authorization token for the client. The authorization token is transmitted as part of a request message for the client application to the server. The custom client authenticator validates the authorization token on behalf of the server. The request message is forwarded to the requested entities executing on the server based on the validating.

20 Claims, 6 Drawing Sheets

(56) References Cited

U.S. PATENT DOCUMENTS

| | | | | |
|---|---|---|---|---|
| 7,925,023 | B2* | 4/2011 | Youn | H04L 63/0807 |
| | | | | 380/278 |
| 8,606,719 | B2 | 12/2013 | Oliver | |
| 8,843,999 | B1 | 9/2014 | Vasquez | |
| 8,973,118 | B2 | 3/2015 | Fitzpatrick, II | |
| 9,160,732 | B2* | 10/2015 | Ronda | H04L 9/3263 |
| 9,736,694 | B2* | 8/2017 | Mihaylov | H04L 63/0807 |
| 9,779,233 | B2 | 10/2017 | Mukherjee | |
| 10,044,723 | B1 | 8/2018 | Fischer | |
| 10,110,582 | B2 | 10/2018 | Sabiwalsky | |
| 10,205,711 | B2 | 2/2019 | Mennes | |
| 10,284,376 | B2* | 5/2019 | Shahabuddin | G06F 16/9535 |
| 2005/0144452 | A1* | 6/2005 | Lynch | G06F 21/33 |
| | | | | 713/170 |
| 2005/0154889 | A1 | 7/2005 | Ashley | |
| 2012/0096525 | A1* | 4/2012 | Bolgert | G06F 11/3006 |
| | | | | 726/6 |
| 2015/0281225 | A1 | 10/2015 | Schoen | |
| 2015/0365419 | A1 | 12/2015 | Lau | |
| 2016/0134660 | A1 | 5/2016 | Ponsini | |
| 2016/0142409 | A1* | 5/2016 | Frei | G06F 21/33 |
| | | | | 713/176 |
| 2017/0109751 | A1* | 4/2017 | Dunkelberger | G06Q 20/4014 |

OTHER PUBLICATIONS

Single Sign-On technologies (see Wikipedia), eg., XOpen SSO PAM. (https://www.uoguelph.ca/ccs/security/internet/single-sign-sso/benefits)—2 pages.

Pluggable Authentication Module (PAM) (—see Wikipedia article for references at the bottom—), e.g., JaaS. (https://en.wikipedia.org/wiki/Java_Authentication_and_Authorization Service).—5 pages.

Microsoft—Web Service Security Scenarios, Patterns, and Implementation Guidance for Web Services Enhancements (WSE) 3.0—359 pages.

* cited by examiner

PROVIDING INTERCOMMUNICATION WITHIN A SYSTEM THAT USES DISPARATE AUTHENTICATION TECHNOLOGIES

CROSS REFERENCES TO RELATED APPLICATIONS

This application is a continuation of the following application, U.S. patent application Ser. No. 16/420,049, entitled CUSTOM AUTHENTICATOR FOR ENTERPRISE WEB APPLICATION, filed on May 22, 2019, which is a continuation of U.S. Pat. No. 10,348,713 entitled PLUGGABLE AUTHENTICATION FOR ENTERPRISE WEB APPLICATION, issued on Jul. 9, 2019, which claims priority from U.S. Provisional Patent Application Ser. No. 62/395,991, entitled PLUGGABLE AUTHENTICATION FOR ENTERPRISE WEB APPLICATION, filed on Sep. 19, 2016 which is hereby incorporated by reference as if set forth in full in this application for all purposes.

This application is related to the following application, U.S. Provisional Application Ser. No. 62/395,341, entitled SYSTEM FOR PROCESS CLOUD SERVICE, filed on Sep. 15, 2016, which is hereby incorporated by reference as if set forth in full in this application for all purposes.

BACKGROUND

The present application relates to computing, and more specifically to systems and methods for facilitating secure communications between multiple client systems and a server-side system, where each of the client systems may employ different authentication technologies, which may differ from the authentication technology employed by the server-side system and/or server upon which it runs.

Systems and methods involving sharing and/or using confidential or secret information among computing devices, software applications, and/or other computing environment resources are employed in various demanding applications, including collaborative enterprise, software development, social networking, and other applications. Such applications often demand efficient mechanisms for enabling disparate systems that employ different authentication technologies to securely communicate with an application that may natively employ yet a different authentication technology or mechanism.

The need for efficient integration and secure communications between computing environment resources, including software applications that may employ different authentication technologies, may be particularly important in enterprise computing environments, where multiple software applications often require secure intercommunications between verified software applications and associated users.

Enterprise computing environments are often complex, requiring secure communications between multiple network resources, e.g., software applications, web services, backend database applications, and so on. Inefficient mechanisms for enabling secure communications between the network resources can be particularly problematic in enterprise applications, as lack of secure intercommunications can yield not only costly security breaches, but reduced software functionality.

An example enterprise computing environment includes many software applications running on an application server, wherein one or more of the software applications must access data and/or functionality of a second software application, also running on the application server. The second software application and/or associated user may require authentication or verification before allowing other entities or network resources, e.g., software applications, to access the data and/or functionality of the second software application.

In such a computing environment, the several software applications, called client applications, may employ different authentication technologies, i.e., authentication technologies that differ from the authentication technologies supported by the second software application (which may be a web application, service, Application Programming Interface (API), or other collection of software functionality and/or data).

Accordingly, when the client applications issue request messages to the second software application, the application server that supports running of the various applications may be unable to securely connect the client applications with the second software application if the client applications do not use a similar authentication technology (embodied in a so-called authenticator) as the second software application or as the application server itself. Accordingly, the application server may not know if a particular request message originated from a trusted client application or whether permission to execute code of the second software application should be granted to the client application and/or associated user thereof.

To address such issues, some application servers may support registering of specific authenticators in the application server, which then performs authentication brokering to facilitate secure communications between systems that may employ disparate authentication technologies. However, conventional approaches to such registration often require complicated registration steps and require custom application-server specific code that is not portable to other computing environments or systems.

SUMMARY

An example method facilitates authenticating a client application to enable communications with another application (called the server-side application herein) running on a server (e.g., application server). The example method includes implementing an authenticator of the client application in a shared library, wherein the shared library and authenticator therein is accessible to the client application and the server; using the server to access the shared library to register a description of the authenticator in a descriptor file maintained by the server, resulting in a registered authenticator; at runtime, receiving a request message and token from the client application at the server, wherein the token has been generated by the authenticator, and wherein the request message is addressed to a server-side application that requires authentication of the client application before enabling communications therewith; at the server, determining that the token is associated with the registered authenticator; confirming that the client application that is associated with the registered authenticator has sent the token; setting an identity of the client application client application; and enabling the request message to be sent to and processed by a server-side application running on the server.

In a more specific embodiment, the authenticator includes code that can be executed to produce a secure token that includes information identifying the client application and/or user or user session thereof. The authenticator is stored and/or implemented at the shared library as an authenticator class.

The step of confirming further includes using the server to access the shared library to execute the authenticator therein that is associated with the received token, resulting in generation of a confirming token. After verifying that the received token is associated with a registered authenticator, when the subsequent confirming token matches the token received with the request message by the server from the client application, this suffices to confirm that the identified client application sent the token to the server.

In the specific embodiment, the authenticator includes and/or is associated with or handled by interface code for interfacing the client application with the shared library and for generating one or more tokens. Furthermore, the server may be an application server that includes authenticator interfacing code for facilitating handling one or more tokens received from the client application and for selectively accessing the shared library, the descriptor file, and an application server security module.

Setting the identity of the client application may further involve using an Application Programming Interface (API) of the application server security module to establish or note, at the server, that an identity of the client application has been authenticated for communications with the server-side application.

The server-side application may employ similar authentication technology as that employed by the server. The client application may employ a different authentication technology than that employed by the server-side application (that requires authentication of a client application before a request message from the client can be fulfilled by the server-side application). The client application may optionally run on the server.

Accordingly, in summary, after an authenticator for a client application has been registered server side and provided to a shared library (shared between the server and the client application), the client application may send a token (e.g., as may be generated by and obtained from the authenticator at the shared library in response to a call thereto) with a request message that is addressed to the server-side application. The server hosting the server-side application then uses the token to check that the authenticator associated with the token is registered.

An additional check may involve running the associated authenticator, e.g., by calling the shared library or client application to run the authenticator to generate a confirming token that includes one or more credentials, e.g., username identifying the client application (which may be associated with a human user). After confirmation, the identity of the client application may be set to enable the client application to communicate with one or more server-side applications (running on the server) in accordance with the identity and permissions associated therewith.

Hence, various embodiments discussed herein may employ a pluggable authenticator that may be simply implemented with a relatively small amount of code, e.g., as may be included in a computing object, such as a class. The authenticator code for producing, handling, and conveying tokens may represent interfacing code between a client application, server, and shared library.

Software applications and servers upon which they run (which may employ different authentication technologies) may be readily adjusted to incorporate such authenticator code for implementing various embodiments discussed herein. Accordingly, software applications that would otherwise be unable to efficiently intercommunicate due to use of disparate authentication technologies can now be readily and efficiently integrated to facilitate intercommunications.

A further understanding of the nature and the advantages of particular embodiments disclosed herein may be realized by reference of the remaining portions of the specification and the attached drawings.

DETAILED DESCRIPTION OF EMBODIMENTS

Figure 1:
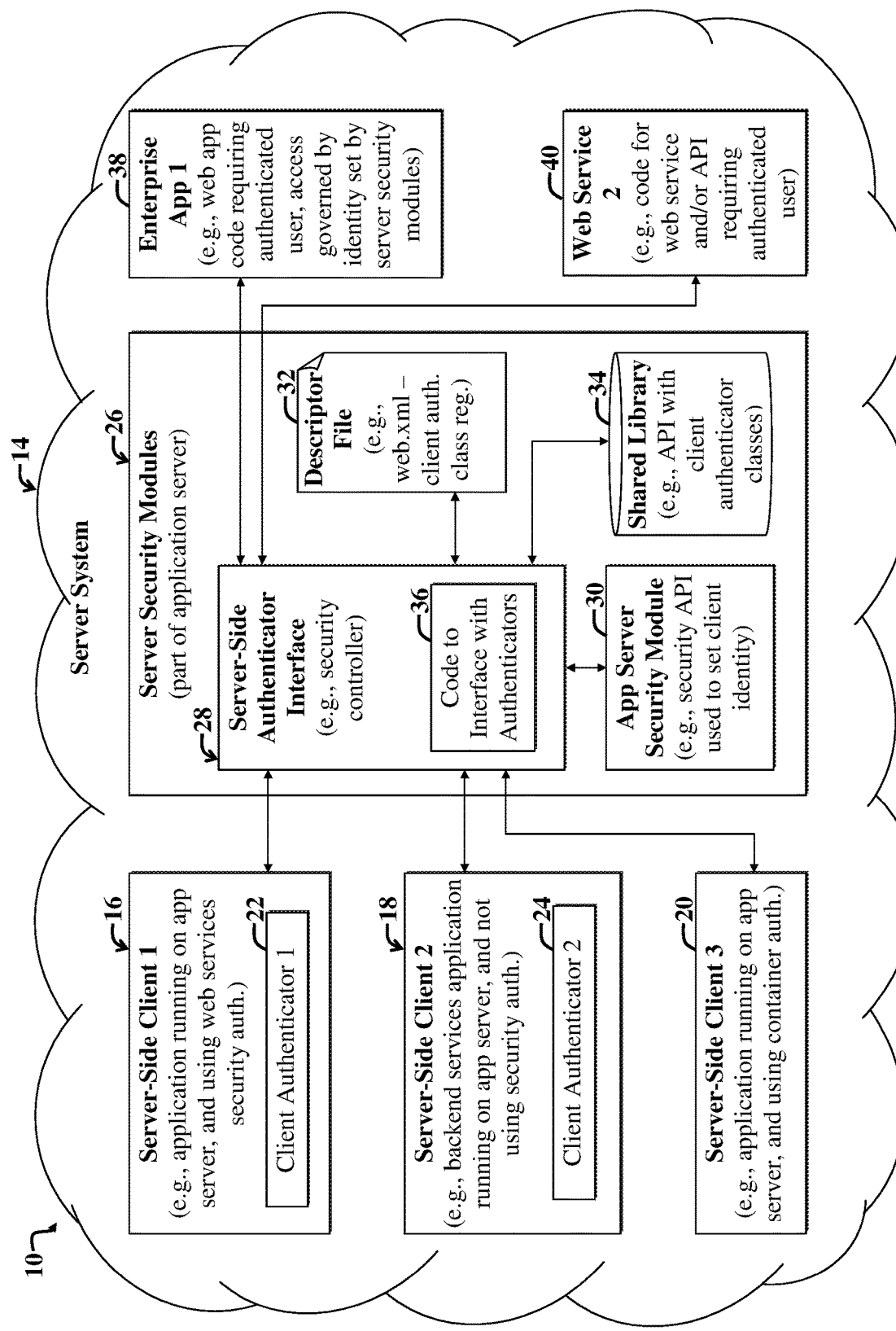
FIG. 1 is first a block diagram illustrating a first example system and accompanying environment configured to facilitate authentication of client applications for communications with other server-side applications, wherein the client applications, server-side applications, and server upon which the applications run may employ different authentication technologies.

In many computing environments, e.g., enterprise computing environments, different software applications or other computing resources require authentication before allowing communications therewith, where the communications involve the sharing of confidential or secret data and/or software functionality. For the purposes of the present discussion, a secure connection may be any connection that requires some form of authentication to verify the identity of a client using the connection.

For example, a cloud-based software development application may provide a shared collaborative development environment involving multiple actors, e.g., users and associated software applications and/or accompanying secure computing sessions. If a first software development application must connect to a second software application via a secure connection, then the first software application and the second software application may require use of a mutually compatible secure mechanism, i.e., authentication technology, for sharing information that can be used for authentication.

Accordingly, various embodiments discussed more fully below relate to the use of tokens and interfacing mechanisms for selectively sharing access to the tokens, also called security tokens herein. For the purposes of the present discussion, a security token may be any collection of data, e.g., user name, time stamp, etc. that may be employed to facilitate identifying a software application and/or associated user of and/or session of the software application, so as to facilitate confirming an identity of the software application and/or user, i.e., so as to facilitate authentication thereof. A secure token may be any encrypted token.

For the purposes of the present discussion, an enterprise may be any organization of persons, such as a business, university, government, military, and so on. The terms "organization" and "enterprise" are employed interchangeably herein.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. Examples of enterprise software include Enterprise Resource Planning (ERP) software for facilitating managing enterprise activities (e.g., product planning, inventory management, marketing, sales, and so on) and Integrated Development Environment (IDE) software for facilitating development of software applications. Example ERP applications include Customer Relationship Management (CRM), Human Capital Management (HCM), Business Intelligence (BI), enterprise asset management, enterprise asset management, corporate performance and governance applications, and so on.

The terms "enterprise software," "enterprise application," and "business application" may be employed interchangeably herein. However, an enterprise application may include one or more enterprise software modules or components, such as UI software modules or components, which may also be called software applications. In general, for the purposes of the present discussion, a software application may be any collection of computer code for implementing particular software functionality. Accordingly, web services, Application Programming Interfaces (APIs), database management systems, interface modules, browsers, Business Process Execution Language (BPEL) templates, and so on may be considered software applications for the purposes of the present discussion. The terms "software application" and "application" may be employed interchangeably herein.

Software functionality may be any function, capability, or feature, e.g., stored or arranged data, that is provided via computer code, i.e., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, compiling computer code, interfacing other software applications (e.g., as may be performed by middleware and associated APIs), and so on.

In an example computing environment, as discussed more fully below, multiple clients may wish to communicate with a particular application, e.g., a web application or other server-side application. However, each client, and the server-side application may not be using the same shared authentication technology or system. While each software application may know what user context that it is employing (where the user context is derived from private information), the user context may not be shared, absent a mechanism for facilitating such. Without such a mechanism, a particular software application, i.e., client, attempting to connect to another software application that demands authentication may be unable to verify that the client is being operated by a particular user, e.g., "John."

The example computing environment may include an application server that supports the running of various software applications. When a user (where the term "user" may refer to a particular software application, communication session, and/or associated human user, depending upon the context in which the term is used) logs into a server-side software application (and is authenticated thereby) running on an application server, the application server may set the identity of the user so as to enable user access to (and use of) data and functionality afforded thereto in accordance with one or more permissions associated with the user, i.e., associated with the user's identity represented by one or more credentials, e.g., username.

However, in various scenarios, the login credentials used to log into an application server may not be used to access data and functionality of other software applications supported by the same application server, unless the other software applications employ similar authentication technology as the application server.

When a user wishes to access data and functionality afforded by a different software application from which the user is currently logged into, conventionally, the application server may not pass user identity to the different software application, unless Single Sign On (SSO) technology is employed by the application server and the different software application. However, conventional SSO technologies are often difficult to implement and may not be readily portable to other computing environments.

If different software applications running on the application server are using different (from each other) authentication technologies or mechanisms, such software applications may not grant access to the web application employed by the user to access the different software applications.

Accordingly, various embodiments discussed more fully below provide mechanisms and accompanying methods enabling multiple software applications to securely connect to another application that requires authentication, even if the multiple software applications and the application to which are attempting to connect employ different authentication technologies.

For clarity, certain well-known components, such as hard drives, processors, operating systems, power supplies, routers, Internet Service Providers (ISPs), identity management systems, workflow orchestrators, process schedulers, integration brokers, Tenant Automation Systems (TASs), OnLine Analytical Processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 is first a block diagram illustrating a first example system 10 and accompanying networked computing environment configured to facilitate authentication of client applications 16-20 for communications with one or more server-side applications 38, 40, wherein the client applications 16-20, server-side applications 38, 40, and server system 14 upon which the applications 16-20, 38, 40 run, may employ different authentication technologies.

Figure 5:
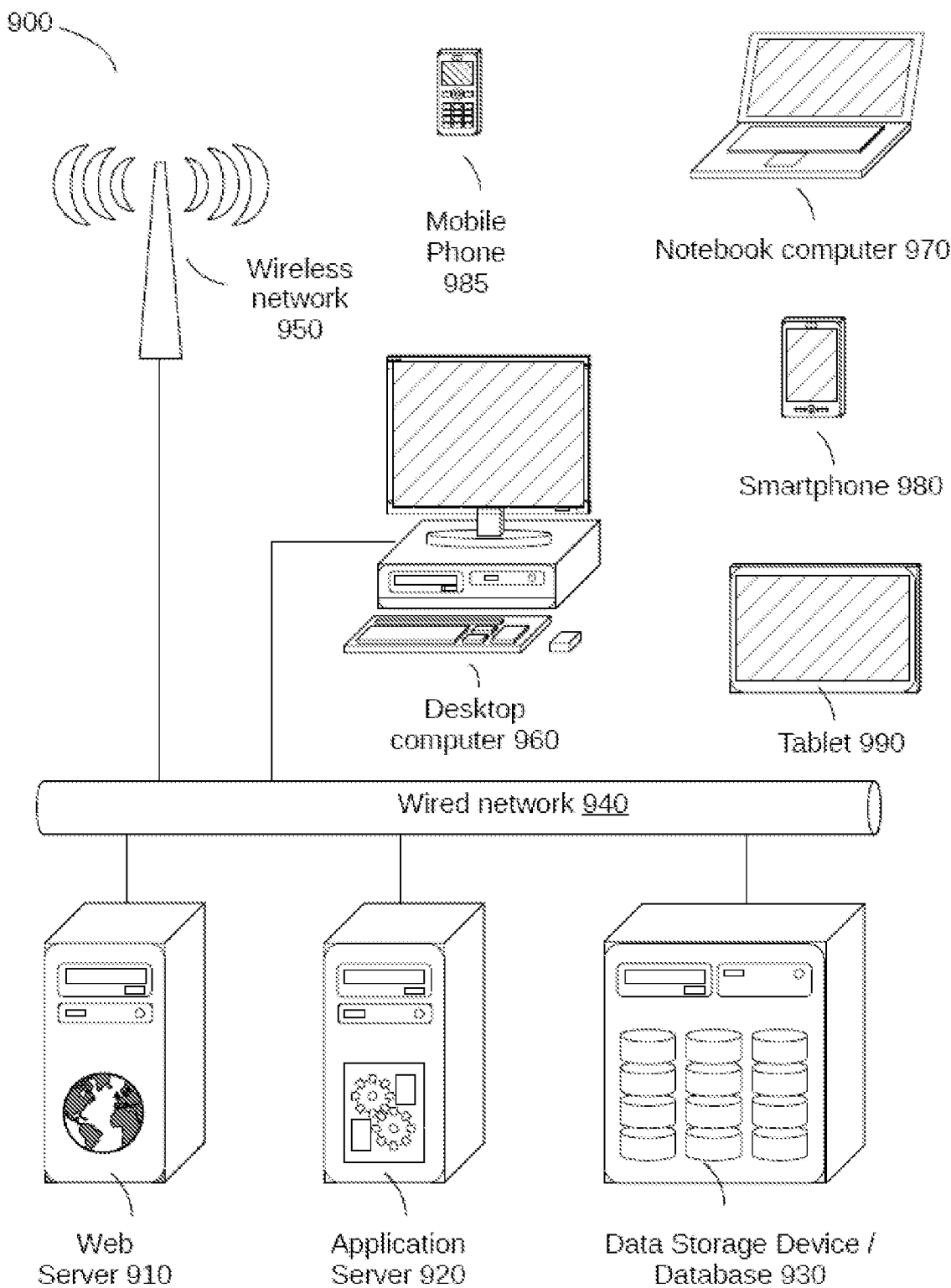
FIG. 5 is a general block diagram of a system and accompanying computing environment usable to implement the embodiments of FIGS. 1-4.

The example system 10 is implemented via a server system 14, which may include one or more intercommunicating servers and accompanying computing resources, e.g., application servers, web servers, backend databases, Application Programming Interfaces (APIs), and so on, e.g., as illustrated in FIG. 5.

For the purposes of the present discussion, a server may be any computing resource, such as a computer and/or software that is adapted to provide content, e.g., data and/or functionality, to another computing resource or entity that requests it, i.e., the client. A client may be any computer, software application, or system that is adapted to receive content from another computer, software application, or system, called a server.

A Service Oriented Architecture (SOA) server may be any server that is adapted to facilitate providing services accessible to one or more client computers coupled to a network. The terms "client," "client application," and "client software application," may be employed interchangeably herein when referring to software that issues one or more request messages that are addressed to another computing resource, called the server-side application herein. The term "client device" as used herein refers to the computer hardware and accompanying client software application(s) running thereon or therein.

Similarly, depending upon the context in which the term is used, the term "server" may refer to a combination of hardware and software, or may refer to software that supports the running of server-side applications. Note that the clients 16-20 and the enterprise applications 38, 40 may run on one or more application servers. Accordingly, the client applications 38, 40 may also be called server-side applications to the extent that they may run on one or more application servers and/or web servers. However, clients to be authenticated need not run entirely server side, i.e., embodiments discussed herein may extend to clients running on or more separate client device(s), e.g., as discussed more fully below with reference to FIG. 2.

Nevertheless, the clients 16-20 are not necessarily referred to as server-side applications herein, so as to facilitate distinguishing the clients 16-20 from the other server-side applications 38, 40 that receive one or more request messages (e.g., for data and/or functionality) from the clients 16-20 and then serve responses in response thereto. In the present example embodiment, the responses are only served when the clients 16, 20 are properly authenticated, i.e., their identity is established sufficiently to meet authentication requirements of the server-side applications 38, 40.

For the purposes of the present discussion, an application server may be a software framework (and/or hardware that supports the software framework, depending upon the context in which the term is used) for providing computing resources for supporting the creation of and running of software applications, e.g., web applications, including web services, APIs, database applications, and so on, that provide data and/or functionality to other software applications, called client applications.

Accordingly, some application servers may implement computing platform that offer software components (e.g., comprising an integrated development environment) that are usable by a software developer (e.g., via an API) to develop web applications. Furthermore, some application servers may behave as virtual machines used to run software applications.

For the purposes of the present discussion, a computing resource may be any component, mechanism, or capability or quantities thereof of a computing environment, including, but not limited to, processors, memories, software applications, user input devices, and output devices, servers, and so on. A user of a computing resource may be a person or may be another computing resource, e.g., software application.

A web application may be any software program or functionality that forms part of a client-server model wherein the software program or functionality may be accessed via one or more clients, e.g., a browser running on a computing device coupled to a network, such as the Internet.

A client-server model may be a computing environment structure or arrangement of computing resources, wherein computing tasks or workloads are distributed between providers (e.g., servers and/or accompanying server-side applications) of a resource, service, and/or associated software functionality and requestors of the resource, service, or functionality.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain or server system 14. For the purposes of the present discussion, a computing domain may be any collection of one or more servers running software that is managed by a single administrative server or associated application. An example of a computing domain is a WebLogic Server (WLS) domain.

In the present example embodiment, the server system 14, which may be implemented via one or more Internet-coupled servers, also called cloud-based servers, includes one or more application servers that host a first server-side client 16, a second server-side client 18, a third server-side client 20, a first enterprise application 38, a second enterprise application (i.e., web service 40), and server software used to implement one or more application servers. The server software includes server security modules 26.

The server security modules 26 include a server-side authenticator interface, also called a security controller herein. For the purposes of the present discussion, an authenticator interface may be any code and/or accompanying software functionality for facilitating implementing an authentication method by enabling communications with other computing resources that must be authenticated or require authentication, or are otherwise involved in an authentication process pertaining to verifying the identity of one or more computing resources.

The server-side authenticator interface 28 has been augmented with authenticator interfacing code 36 to facilitate implementing and communicating with other authenticators (e.g., client-side authenticators 22, 24 and corresponding authenticator(s) implemented at a shared library 34) used to implement various embodiments discussed herein, as discussed more fully below. For example, a first client 16 includes a first client authenticator 22, and a second client 18 includes a second authenticator 24, both authenticators 22, 24 of which include code for facilitating communications with the server-side authenticator interface 28 and a shared library 34.

The shared library 34 may be implemented as part of the server security modules 26. The shared library 34 communicates with the server-side authenticator interface 28, and may communicate with one or more other modules of the server system 14 via the server-side authenticator interface 28.

Similarly, a descriptor file 32, e.g., an eXtensible Markup Language (XML) file 32, also communicates with the server-side authenticator interface 28. In general, the server-side authenticator interface 28 includes additional code for selectively routing communications between various modules, including the application server security module 30, the descriptor file 32, and the shared library 34.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the server security modules 26 may represent part of an application server that hosts the clients 16-20 and the server-side enterprise applications 38, 40. Furthermore, in certain use case scenarios, the enterprise applications 38, 40 may act as clients to the client applications 16-20 as opposed to only vice versa.

In addition, while the clients 16-20 may communicate with the shared library 34 via the server-side authenticator interface 28 of the server security modules 26 in FIG. 1, one or more of the clients 16-20 may communicate directly with the shared library 34, i.e., not using the server-side authenticator interface 28 as a communications intermediary.

In the present example embodiment, the first client 16 represents a web service that is to be authenticated (using the server security modules 26) for access to the first server-side application 38 (e.g., which may be an enterprise application) and/or the second server-side application 40 (e.g., which may be a web service). The first client 16 may be, for example, a REpresentational State Transfer (REST) web service (also called a RESTful web service) that natively employs or supports standard Web Services Security (WSS) authentication technology.

However, in the present example embodiment, the server-side applications 38, 40, do not natively employ WSS security authentication technology. Accordingly, the first client 16 and the server-side applications 38, 40 with which the first client 16 is to communicate will not support authenticated communications therebetween without a mechanism to account for the discrepancies in how the authentication technologies and accompanying interfaces function.

Furthermore, note that the server system 14 and accompanying server security modules 26 may natively employ a yet a different authentication technology or mechanism than that employed by the first client 16. For example, the server security modules 26 may employ container security, i.e., security technology natively supported by an application server that supports running of the various software applications 16-20, 38, 40. The container security may be incompatible with the WSS technology employed by the first client 16, absent use of embodiments discussed herein.

In the present example embodiment, the first server-side application 38 and the second server-side application 40 employ container security, such that when one of the clients 16-20 is authenticated, i.e., its identity is set by the application server security module 30, then the authenticated client may communicate with one or more of the server-side applications 38, 40 in accordance with access permissions associated with the set identity.

The application server security module 30 and accompanying server-side authenticator interface 28 may natively support container security authentication technologies, i.e., mechanisms (e.g., in accordance with a security policy afforded by an Enterprise Java Beans container) to facilitate implementing and enforcing an application server security policy. Additional authenticator-interfacing code 36 is added to support implementation of various embodiments as discussed herein.

Accordingly, the first client authenticator 22 is installed on the first client 16, and a version thereof is also installed at or otherwise implemented via the shared library 34 for use by the server-side authenticator interface 28 and accompanying code 36 to facilitate interfacing authenticators (e.g., the first client side authenticator 22, a version of the first client-side authenticator implemented via the shared library 34, and the server-side authenticator interfacing code 36). Note that the first client authenticator 22 may include computer code for communicating with the shared library 34 and enabling implementation of a version of the first authenticator 22 at the shared library 34. Alternatively, the authenticator is first installed at the shared library 34 and then, appropriate interfacing code 22 is installed at the first client 16. The order of installation of the authenticators and associated interfacing code may vary, without departing from the scope of the present teachings.

The authenticator implemented at the shared library 34 may be an authenticator object, e.g., an authenticator class that may include a collection of data and functionality for facilitating generating tokens and for further facilitating communications with the server-side authenticator interface 28 and the first client 16.

For the purposes of the present discussion, an authenticator may be any portion of computer code and accompanying data that may generate a security token and communicate that token to one or more other computing resources of the accompanying computing environment, e.g., via an interface that is at least partly defined by the authenticator. Accordingly, two software applications that include a version or instance of compatible authenticators may use the authenticators to implement an interface for exchanging security tokens and related data. The interface may specify communication protocols to be used (e.g., type of encryption to be employed); how to package the tokens (e.g., as message headers, cookies, Uniform Resource Locator (URL) parameters, etc.); which communication port(s) to use, and so on.

In the present example embodiment, various authenticators discussed herein, e.g., the first client authenticator 22, the second client authenticator 24, authenticator classes implemented at the shared library 34, and the authenticator-interfacing code 36 included in the server-side authenticator interface 28, may be implemented as Pluggable Authentication Modules (PAMs). For the purposes of the present discussion, a PAM may be any mechanism or collection of functionality for integrating an authentication scheme, e.g., as part of an API, such that software applications involved in authentication can be authenticated to enable intercommunications without relying upon underlying or native authentication technologies (e.g., authentication schemes), which may differ or otherwise be incompatible with each other. Certain PAMs may also be plugged into, i.e., installed as a plugin to the software applications that are to intercommunicate after authentication.

The second authenticator 24 of the second client 18 operates similarly to the first authenticator of the first client 22. The second client 18 may represent, for example, a backend services application, e.g., a database application that does not employ a native authentication technology, but nevertheless must be authenticated before being granted access to data and/or functionality afforded by the server-side applications 38, 40. Alternatively, as another example, the second client 18 may employ yet a different type of authentication technology, e.g., Time-Based One-Time Password Algorithm (TTOP) such as Open Authentication (OAuth or OATH), JavaScript Object Notation (JSON) Web Token (JWT), or other authentication technology.

In either case, the second authenticator 24 makes a version of the second authenticator 24 available to the server security modules 26 via the shared library 34, thereby facilitating integrating disparate authentication technologies to facilitate communications between disparate systems that may require or perform authentication using different authentication technologies.

Note that while in the present example embodiment, the first authenticator 22 and the second authenticator 24 are shown as being installed on the first client 16 and the second client 24, respectively, that embodiments are not limited thereto. For example, implementation of functionality of the authenticators that enables production of tokens may be instead only run on the shared library 34. In such case, the client authenticators 22, 24 and the server-side authenticator interface 28 may still retain code and accompanying software functionality for communicating with the shared library 34 to access token-producing functionality of authenticators implemented therein.

If a software developer of a client application prefers that the client application not employ the shared library 34, the developer can implement a custom client authenticator for use with the client application. However, to facilitate interoperability with the server-side authenticator interface 28, the custom authenticator is registered in the descriptor file 32.

The descriptor file 32 may register the name of the custom authenticator into a list of authenticator parameters. For example, the authenticator parameters in the descriptor file 32 may be the following, where "mycustom" is the example authenticator name:

```
<context-param>
    <param-name>authenticators</param-name>
    <param-value>wfcontext,jsessionid,pa,mycustom</param-value>
</context-param>
```

The descriptor file 32 may register a handler which contains the primary logic for the custom authenticator. An example of registering the handler for the example above is:

```
<context-param>
    <param-name>mycustom</param-name>
    <param-value>oracle.myproduct.mypackage.MyCustomAuthenticator</param-value>
</context-param>
```

In some embodiments, the custom authenticator handler may implement a shared interface. Further, the custom authenticator may pass an authentication token, either as a header, cookie, or URL parameter.

In the present example embodiment, the third server-side client 20 employs an authentication technology that is shared by the application server upon which it runs, e.g., the same application server that runs the server security modules 26. For example, the third client 20 may employ container security (e.g., EJB container security). In this case, the third client 20 need not employ a client authenticator as discussed herein, as the third client 20 will already support identity passing during communications with the server-side authentication interface 28 and application server security module API 30.

In an example use case scenario, a client application (e.g., the first client 16) is to call an application server and accompanying server-side application (e.g., the first server-side enterprise application 38) running on the application server. The server-side application 38 represents computer code that requires user authentication, e.g., authentication of the client 16 (wherein the term "user" as employed herein may include a software application that makes a call on behalf of a human user of the software application).

The client 16 is to make a call to the server-side application 38, e.g., issue a request message addressed to the first server-side application 38, on behalf of a human user, to the application server represented, in part, by the server security modules 26 and the server-side application 38. Without implementation of various embodiments discussed herein, the security modules 26 and server-side enterprise application 38 will not know whether the request came from a trusted client application and/or whether the client application 16 should be given permission to direct execution of the code, i.e., the code of the server-side application 38, on behalf of the client application and associated human user.

To address this challenge, at the server-side authenticator interface 28, a Java interface (e.g., as may be called "ApplicationAuthInterface") corresponding to the authenticator-interfacing code 36 is defined at the application server. The client application 16 implements a similar authenticator interface (e.g., as may be called "ApplicationAuthImpl") via the first client authenticator 22.

An authenticator class representing the client authenticator 22 is then implemented at the shared library 34. Access to the implemented authenticator class is accessible to (i.e., shared by) both the client 16 and the server security modules 26.

The authenticator class at the shared library 34 is then registered at the descriptor file 32 (e.g., in a web.xml file), such that the descriptor file 32 is modified to indicate, e.g., via one or more parameters, that the first client authenticator 22 ("ApplicationAuthImpl") has been registered with the server security modules 26 and accompanying application server(s).

An example registration entry in the descriptor file 32 may specify an authenticator name parameter and value; an authenticator handler parameter and value; and one or more context parameters.

Authenticator name registration may take, for example, the following form:

```
<context-param>
    <param-name>authenticators</param-name>
    <param-value>wfcontext,jsessionid,pa,mycustom</param-value>
</context-param>
```

An example form for handler registration is as follows:

```
<context-param>
    <param-name>mycustom-authenticator</param-name>
    <param-value>oracle.myproduct.mypackage.MyCustomAuthenticator</param-value>
</context-param>
```

The identified handler references code allowing calling of the authenticator class at the shared library 34 at runtime to perform token validation, i.e., confirmation, as discussed more fully below.

After registration of the authenticator 22 in the descriptor file 32, e.g., via the corresponding authenticator class at the shared library 34 and the authenticator-interfacing code 36, the first client 16 may issue a request message addressed to the intended recipient, e.g., the first server-side application 38.

In the present example scenario, the issued request message includes a token generated for the first client application 16. The token is generated at the shared library 34 via a version of the client authenticator 22 that is implemented at the shared library 34. The version of the first client authenticator 22 that is implemented at the shared library 34 includes token-generation functionality, i.e., computer code for generating a token for the first client application 16 in response to a request from the client authenticator 22 sent to the shared library 34 referencing the corresponding authenticator class implemented thereby.

Accordingly, at runtime, the first client 16 triggers generation of a token by the shared library 34. The token (e.g., as may be called "T1") is then returned to the client 16 for incorporation into a request message (e.g., via a header thereof) addressed to the first server-side application 38. Note that in an alternative implementation, the first client 16 may generate the token using the first client application 16, without requiring the shared library 34 to generate and return the token to the first client 16.

Upon receipt of the request message and accompanying token from the first client 16, the server security modules 26 then use the received token to check that the authenticator for the token T1 has been registered at the descriptor file 32. In the present example scenario, the authenticator-interfacing code 36 determines that the registered authenticator for the token T1 indeed corresponds to the first client authenticator 22 and is named "ApplicationAuthImpl."

To confirm the identity of the client 16 that sent the token and request message, the authenticator-interfacing code 36 then communicates with the shared library 34 to run "ApplicationAuthImpl" implemented thereby. The "ApplicationAuthImpl" authenticator at the shared library 34, called by the authenticator-interfacing code 36, then generates a token with an accompanying user name and/or other credential. If the token returned from the shared library 34 in response to execution of "ApplicationAuthImpl" at the shared library 34 is the token T1 or is otherwise representative thereof, the first client 16 and associated request message and token T1 are considered validated, i.e., authenticated.

Note that the first client 16 may use a common port (i.e., a similar port as used by the server security modules 26) to communicate with the shared library 34, thereby helping to ensure that the shared library 34 process knows that the client 16 that may be requesting sensitive data and interactions with the server application security modules 26 and accompanying server-side applications 38, 40, represents or is associated with the same entity that has registered with the shared library 34 over a known port with the server security modules 26.

Accordingly, the server security modules 26, including the application server security module 30, are used to set user identity for the first client 16. The application server security module 30 may set user identity in a Java subject using an application-server-specific security API implemented via the application server security module 30.

The application server security module 30 then forwards, e.g., via the server-side authenticator interface 28, the request message issued by the first client 16 to the server-side application 38 (which demands authentication) before acting upon and fulfilling the request contained in the request message.

Once the identity of the client 16 has been set, the server-side application 38 treats the client 16 and associated request message as having been authenticated. In the present example use case scenario, this is facilitated in part by the fact that the first server-side application 38 and the application server security module 30 and accompanying application server employ similar authentication technologies, e.g., container security.

Accordingly, as the user and/or associated client 16 has been authenticated, the request message issued by the first client 16 is fulfilled by the first server-side application 38, and any code execution required to fulfill the request message is performed successfully.

In a more detailed example use case scenario, the first client 16 is secured by a JWT token. Another client application, e.g., the second client 18 is secured by a Business Process Management (BPM) context token. Both clients 16, 18 intend to connect to a server-side application 40 via the server security modules 26. Both client applications implement "ApplicationAuthImpl," e.g., via client authenticators 22 and 24, respectively. Both clients 16, 18 register via the descriptor file 32 of an application server that supports the security modules 26.

At the time of issuance of request messages, the first client 16 sends a JWT token to the server security modules 26. The security modules 26 verify the token via the registered authenticator for the first client 16.

Similarly, the second client 18 sends a BPM context token to the server security modules 26. The server security modules 26 then facilitate verifying the second token (e.g., as may be called "T2") via the registered authenticator for the second client 18.

Accordingly, both clients 16, 18, which are secured in a different way, i.e., using different authenticator technologies, are able to propagate identity to the server security modules 26 to thereby enable communications with one or more of the server-side applications 38, 40 in accordance with one or more permissions associated with the identities.

Figure 2:
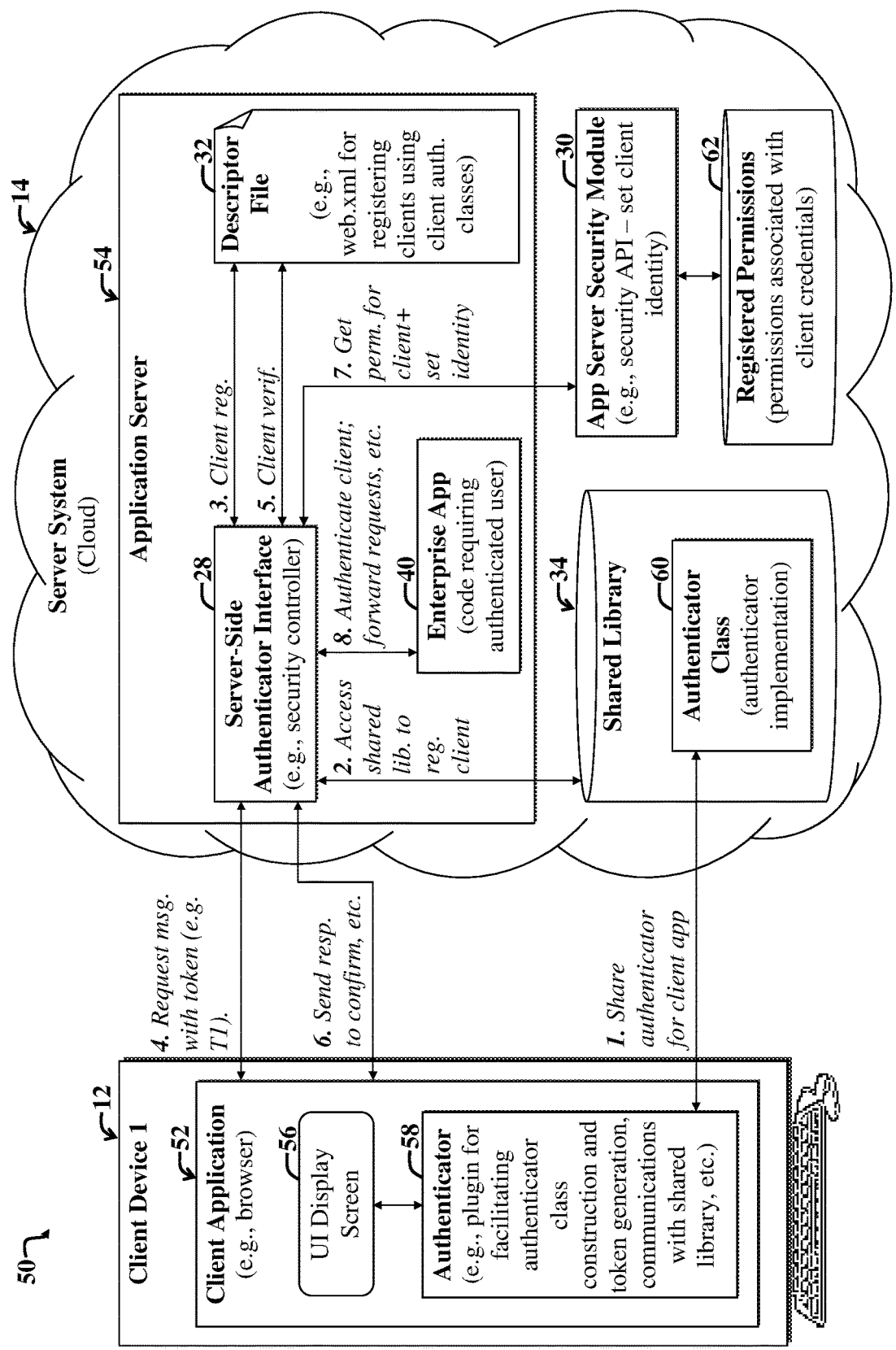
FIG. 2 is a second block diagram illustrating an alternative example embodiment, wherein a client application is not running on a server, but is instead running on a client device that communicates with the server so as to communicate with the server-side application after authentication of the client application.

FIG. 2 is a second block diagram illustrating an alternative embodiment, wherein a client application 52 (e.g., a browser) is not running on a server, e.g., application server 54, but is instead running on a client device 12 that communicates with the server 54 (e.g., via a network, such as the Internet) so as to communicate with the server-side application 40 after authentication of the client application 52.

In the present example embodiment, the client device 12 runs a bowser 52, representing an example client application. A user of the browser 52 may browse to and view a website that displays one or more User Interface (UI) controls, e.g., via a UI display screen 56. The website may enable the running of code on a web server, so as to access data and/or functionality afforded by enterprise application 40. In the present example embodiment, the enterprise application 40 runs on the application server 54, which may form part of an overall server system 14 or cloud.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

For the purposes of the present discussion, a networked computing environment may be any computing environment that includes intercommunicating computers, i.e., a computer network. Similarly, a networked software application may be computer code that is adapted to facilitate communicating with or otherwise using one or more computing resources, e.g., servers, via a network. A networked software application may be any software application or computer code adapted to use data and/or functionality provided via one or more resources, e.g., data, memory, software functionality, etc., accessible to the software application via a network.

Initially, to access the enterprise application 40, an authenticator 58, which is implemented as a plugin to the browser 52, provides a version of the authenticator 58 to the shared library 34 as an authenticator class 60. Note that while in the present example embodiment, the shared library 34 is shown running separately from the application server 54, the shared library 34 may be implemented on the application server 54, without departing from the scope of the present teachings.

Furthermore, note that the application server security module 30 and registered permissions module 62 (which stores information about permissions for various identities set by the application server security module 30) are shown running separately from the application server 54, e.g., on another application server. The other application server may be part of a domain of application servers that includes the application server 54.

After the authenticator class 60 is installed or otherwise provided to the shared library 34, the server-side authenticator interface 28 accesses the shared library 34 and associated authenticator class 60 to facilitate registration of the authenticator corresponding to the authenticator class via an entry in the descriptor file 32.

After registration of the authenticator 58, 60 (via the descriptor file 32 of the application server 54), the browser 52 issues a request message with a token, e.g., token T1, which is delivered to the server-side authentication interface 28, but which is addressed to the enterprise application 40.

Note that while in the present example embodiment, the request message (at step 4.) appears to be delivered directly to the server-side authenticator interface 28, that in practice, the request message may be issued by a web application that is, in turn. issued in response to a message from the browser 52, e.g., in response to user selection of a UI control in the UI display screen 56 of the browser.

Furthermore, note that the token T1 issued in the request message from the client 52 (e.g., as step 4.) may be obtained by the client application 52 in response to a call made to the shared library to run the authenticator class 60 to produce the token T1. Alternatively, the token T1 may be generated by running authenticator code 58 maintained via the client application 52, without departing from the scope of the present teachings.

Subsequently, the server-side authenticator interface 28 accesses the registration information at the descriptor file 32 to check that the received token is associated with a registered authenticator. If the client application 52, i.e., browser 52, passes the initial check as having a registered authenticator 58 at the descriptor file 32, then the associated authenticator 58 is run.

Note that a version of the authenticator 58 may be run at the shared library 34 via the corresponding authenticator class 60 in response to a call from the server-side authenticator interface 28 to the shared library 34.

Alternatively, the server-side authenticator interface 28 calls back to the client application 52 and accompanying authenticator 58 to generate and issue a confirming token (also called confirmatory token herein), i.e., to reissue token T1 to confirm that the client application 52 is the application that is sending the request message with the token T1. The client-side authenticator 58 is run (in response to the call from the server-side authenticator 28) via the browser 52 (e.g., at step 6.) so as to trigger resending of the token T1 to the server-side authenticator interface 28.

Note that the token may specify, for example that the user of the client application 52 is named "John." The name "John" identifies the client application 52. Furthermore, the authenticator 58, 60 associated with "John" will have been registered via an entry in the descriptor file 32.

In response to a token match, wherein the token sent (at step 4.) from the browser 52 matches the confirming token (sent at step 6.), the server-side authenticator interface 28 then communicates with the application server security module 30 to facilitate setting the identity of the client application 52. Note that a given user identity may be associated with predetermined permissions, as maintained via a registered permissions module 62. The set identity may include a specification of permissions associated with the identified user, i.e., John.

Figure 3:
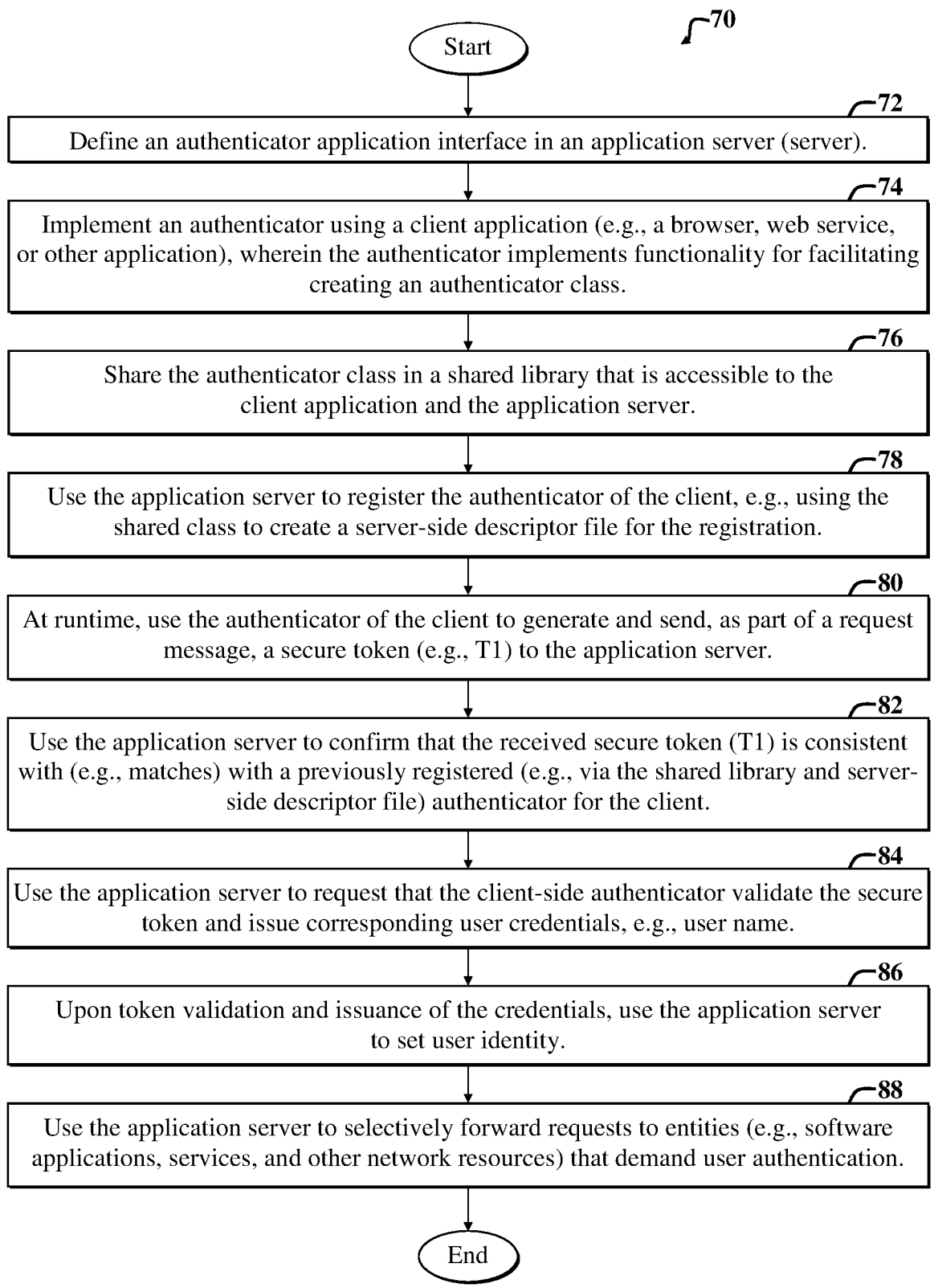
FIG. 3 is a flow diagram of a first example method implementable via the embodiments of FIGS. 1-2.

FIG. 3 is a flow diagram of a first example method 70 implementable via the embodiments of FIGS. 1-2, and which involves defining and using one or more authenticator interfaces.

The first example method 70 includes and initial interface-defining step 72, which involves defining an interface and associated configuration in an application server. For example, with reference to FIG. 2, the server-side authenticator interface 28 is supplied with additional code and/or configurations for interfacing with an authenticator at a shared library; with a descriptor file; and with one or more client applications. Such definition is represented more specifically as the authenticator-interface code 36 of FIG. 1.

In a subsequent authenticator-implementation step 74, an authenticator is implemented using a client application, called the client (e.g., a browser, web service, or other application). The authenticator implements functionality for facilitating creating an authenticator class, e.g., the authenticator class 60 of FIG. 2.

Next, an authenticator-sharing step 76 includes sharing the authenticator class in a shared library that is accessible to the client and the application server.

A subsequent authenticator-registration step 78 includes using the application server to register the authenticator of the client, e.g., using the shared class to create a server-side descriptor file for the registration.

Next, at runtime, a request-issuing step 80 includes using the authenticator of the client to trigger generation of and sending of a request message that includes (or is otherwise sent in association with), a secure token (T1) to the application server.

A subsequent registration-checking step 82 includes using the server application to perform an initial check, which includes checking or confirming that that the received secure token T1 is consistent with (e.g., matches) with a previously registered (e.g., via the shared library and server-side descriptor file) authenticator for the client.

Next, an identity-confirming step 84 includes using the application server to request that the client-side authenticator (and/or authenticator maintained at the shared library) validate the secure token and issue corresponding user credentials. Validation may involve confirming that initially received token T1 matches a subsequently generated token that is generated in response to a callback to the authenticator at the shared library or otherwise at the client by the application server.

Subsequently, an identity-setting step 86 includes using the application server to issue credentials, e.g., use name and access privileges, for the client upon successful completion of the identity-confirming step 84.

Next, a request-forwarding step 88 includes using the application server to selectively forward requests to entities (e.g., software applications, services, and other network resources) that demand user authentication.

Note that the method 70 may be modified, without departing from the scope of the present teachings. For example, embodiments discussed herein are not necessarily limited to use with an application server and a particular type of client application. Accordingly, an example modification to the method 70 involves replacing the term "application server" with another term, such as server domain, web server, and so on.

Figure 4:
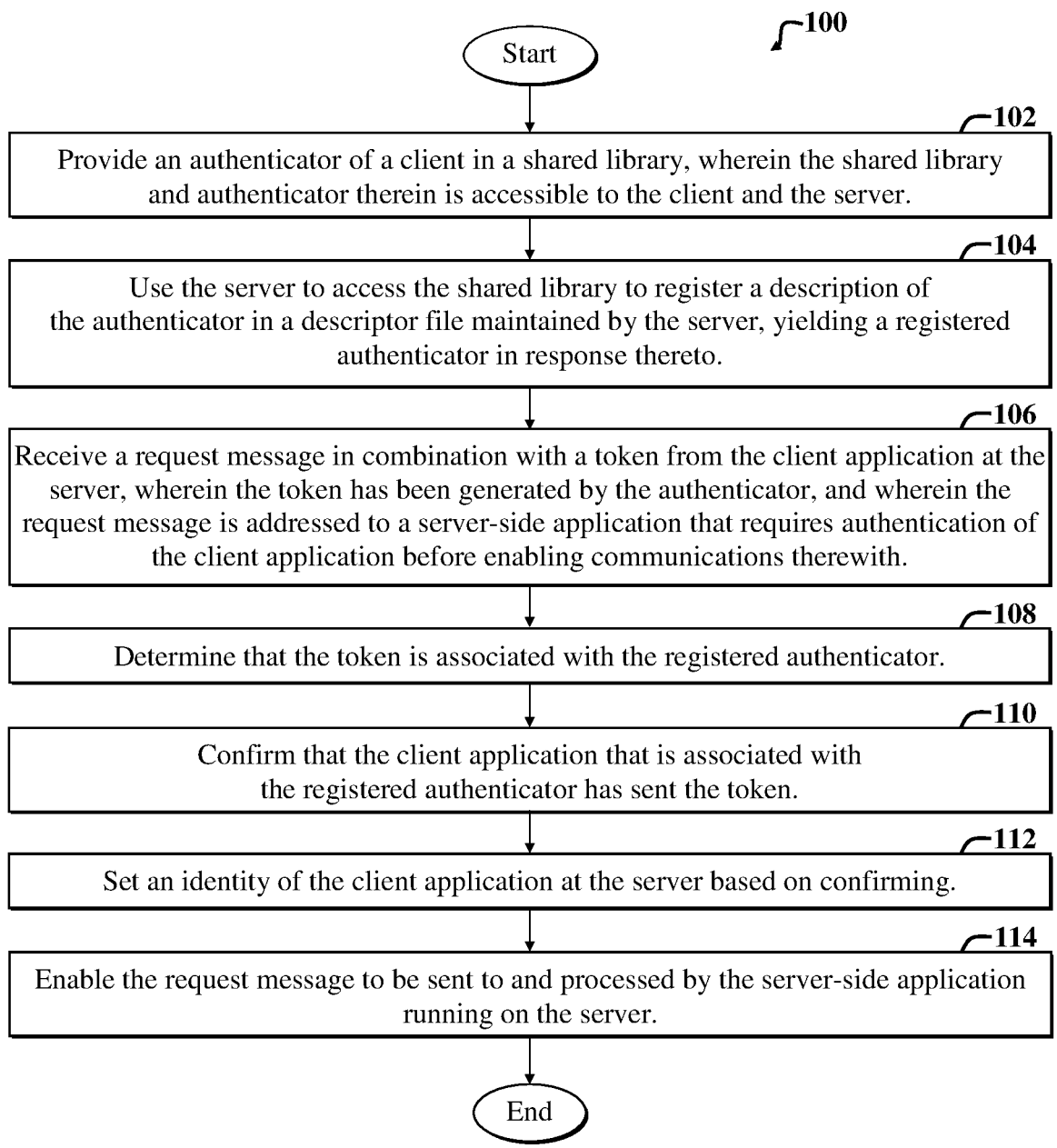
FIG. 4 is a flow diagram of a second example method implementable via the embodiments of FIGS. 1-2.

FIG. 4 is a flow diagram of a second example method 100 implementable via the embodiments of FIGS. 1-2. The second example method 100 facilitates authenticating a client application (also simply called "client" herein) to enable communications with another server-side application running on a server that requires authentication of clients communicating with the server-side application.

The second example method 100 includes a first step 102, which includes providing an authenticator of the client application in a shared library, wherein the shared library and authenticator therein is accessible to the client application and the server.

A second step 104 includes using the server to access the shared library to register a description of the authenticator in a descriptor file maintained by the server, yielding a registered authenticator in response thereto.

A third step 106 includes receiving a request message in combination with a secure token from the client application at the server. The token has been generated by the authenticator. The request message is addressed to a server-side application that requires authentication of the client application before enabling communications therewith.

A fourth step 108 includes determining that the token is associated with the registered authenticator.

A fifth step 110 includes confirming that the client application that is associated with the registered authenticator has sent the token.

A sixth step 112 includes setting an identity of the client application at the server based a successful confirmation during the fifth step 112.

A seventh step 114 includes enabling the request message to be sent to and processed by the server-side application running on the server upon setting of the identity in step 112.

Note that the second example method 100 may be modified, without departing from the scope of the present teachings. For example, the second example method 100 may be modified to specify that the authenticator includes token-generating code that can be executed to produce a secure token that includes information identifying the client application. The authenticator may be stored at the shared library as an authenticator class.

The fifth step 110 may further include accessing the shared library to execute the authenticator therein that is associated with the received token, resulting in generation of a confirming token. A successful confirming step 110 involves confirming that the library-issued token matches the token received with the request message by the server from the client application.

The authenticator may further include interface code for interfacing the client application with the shared library, in addition to code for generating one or more tokens.

The second example method 100 may further specify that the server is an application server that includes authenticator interfacing code for facilitating handling one or more tokens received from the client application and for selectively accessing the shared library, the descriptor file, and an application server security module.

The sixth step 112 may further include using an Application Programming Interface (API) of the application server security module to establish that an identity of the client application has been authenticated. The server-side application may employ similar authentication technology as that employed by the application server, whereas the client application may employ a different authentication technology than that employed by the server and/or accompanying server-side application that requires authentication of a client application before a request message from the client can be fulfilled by the server-side application. The client application runs on the server.

FIG. 5 is a general block diagram of a system 900 and accompanying computing environment usable to implement the embodiments of FIG. 1-4. The example system 900 is capable of supporting or running various hardware and/or software modules and associated methods discussed with reference to FIG. 1-4. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as Rich Site Summary (RSS) feeds of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computer.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

For example, with reference to FIGS. 1 and 5, the client system 12 of FIG. 1 may be implemented in whole or in part via one or more of the desktop computer 960, notebook computer 970, smartphone 980, mobile phone 985, tablet 990, of FIG. 5 and/or other computing devices. In a particular example embodiment, the computing devices 960-990 run browsers, e.g., the browser 52 of FIG. 2, which may be used to display UIs (e.g., via the UI display screen 56 of FIG. 2) for interacting with the business application(s) 40 and shared library 34 of FIG. 2.

In a particular example embodiment, browsers 52 of the client system 12 of FIG. 1 connects to the Internet, represented by the wired network 940 and/or wireless network 950 as shown in FIG. 5, to access one or more network-coupled servers, databases, and/or associated cloud-based functionality, as represented by the server system 14 and accompanying modules 54, 34, 30, and 62 of FIG. 2.

Note that one or more of the web server 910, application server 920, and data storage device or database 930 shown in FIG. 5 may be used to host software corresponding to the modules 54, 34, 30, and 62 of FIG. 2, as detailed more fully below. The modules 16-40 of the system 10 of FIG. 1 may be implemented entirely on the application server(s) 920. Nevertheless, users communicating and interacting with or otherwise leveraging functionality afforded by the modules 16-40 may communicate therewith using one or more of the client devices 950-990. An example of such a client device is the client device 12 of FIG. 2.

In a particular example embodiment, the application server 54 and accompanying server-side authenticator interface 28, descriptor file 32 and enterprise application 40; the shared library 34 and accompanying authenticator class 60; and the application server security module 30 and accompanying registered permissions module 62 of FIG. 2 run in a cloud computing environment that includes a collection of plural web servers 910, application servers 920, and data storage devices 930 shown in FIG. 5.

For example, in the particular example embodiment, the business application(s) 28 and accompanying token viewer 36 of FIG. 1 run on one or more application servers as part of a server domain (e.g., a WebLogic domain) implemented via a process cloud that communicates with a document cloud via an integration mechanism, e.g., middleware, APIs, web services, etc.

Data from the document cloud may be accessible to the enterprise application 40 of FIG. 1 via one or more web services and/or APIs, which may be implemented, for example, via the second client application 18 or second server-side application 40 of FIG. 1.

The process cloud in combination with the document cloud act as an overall cloud that supports development, deployment, adaptation, and use of software applications (e.g., the applications 16, 18, 20 and 38, 40 of FIG. 1 and the enterprise application(s) 40 of FIG. 2) and secure access thereto, in part via the authenticators and associated interfaces as discussed herein, including the client authenticators 22, 24, shared library 34 and server-side authenticator-interfacing code 36 of FIG. 1.

In the particular example embodiment, UI display screens, e.g., the UI display screen 56 of FIG. 2, may be presented via the browser 52 of FIG. 2 and may include accompanying UI controls and associated options. Example options include options to browse, create, delete, define, upload, download, etc., folders, structures, and documents, etc., as maintained via the folder structures and documents.

Note that in the particular example embodiment, browser 52 used by the client system 12 of FIG. 2, interfaces with web servers 910 shown in FIG. 5 to access websites and accompanying webpage code, which is backed by applications, e.g., the enterprise application(s) 40 and server-side authenticator interface 28 and descriptor file 32 of FIG. 2.

The webpage code of the web servers 910 of FIG. 5 uses web services, APIs, and/or other interfacing mechanisms to communicate with application software 40 via the server-side authenticator interface 28 of FIG. 1.

Note that various embodiments discussed herein may provide substantial benefits in terms of enabling the sharing of secure data among disparate enterprise computing resources (e.g., software applications, which may include APIs, web services, database management systems, and other software applications) that may otherwise (in absence of the use of an embodiment using the authenticators and accompanying methods discussed herein) employ incompatible authentication technologies prohibiting secure intercommunications.

Furthermore, computer code, as may be implemented via authenticators (e.g., authenticators 22, 24 and implemented at the shared library 34, and the associated authenticator-interfacing code 36) discussed herein, for generating tokens and communicating with the shared library 34 of FIGS. 1 and 2 requires minimal code. Those skilled in the art with access to the present teachings may readily implement and use such code to meet the needs of a given implementation, without undo experimentation.

Accordingly, various embodiments provide new capabilities for efficient software integration, in part by uniquely leveraging a shared library and interfacing code for generating and selectively sharing tokens in a computing environment.

Figure 6:
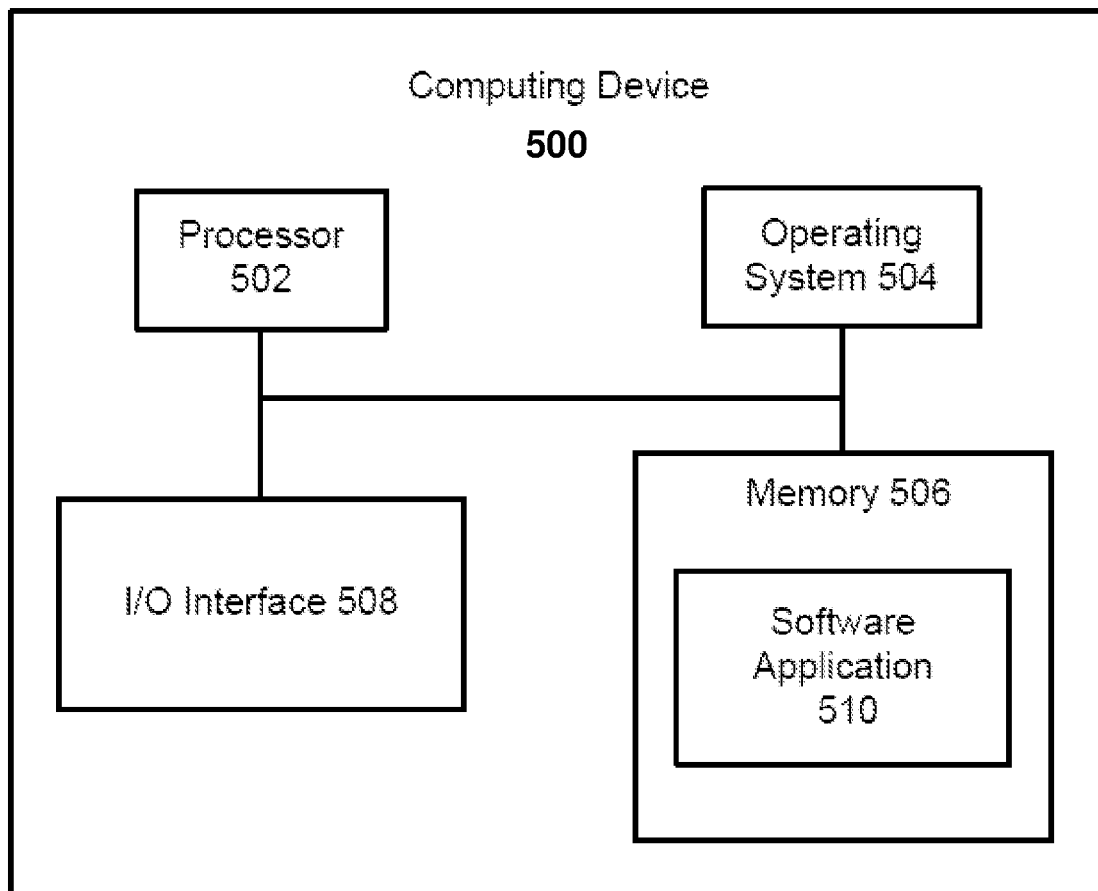
FIG. 6 is a general block diagram of a computing device usable to implement the embodiments of FIGS. 1-5.

FIG. 6 is a general block diagram of a computing device 500 usable to implement the embodiments described herein. While the computing device 500 of FIG. *6 may be described as performing one or more of the steps in the embodiments herein. In other embodiments, any suitable component or combination of components of the computing device 500 or any suitable processor or processors associated with system 500 may facilitate performing the steps.

FIG. 6 illustrates a block diagram of an example computing system 500, which may be used for implementations described herein. For example, computing system 500 may be used to implement server devices 910, 920 of FIG. 5 as well as to perform the method implementations described herein.

In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 6 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein address use of tokens generated by authenticator interfaces implemented via pluggable authentication modules installed in association with client applications running on an application server and/or server domain, a shared library, and the software framework defining an application server or domain, embodiments are not limited thereto. For example such embodiments can be employed to facilitate intercommunications between software applications installed on a single computer, e.g., desktop computer, where the software applications require that other applications and associated users interacting therewith be authenticated, i.e., identified.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for providing intercommunication within a system that uses disparate authentication technologies, the method comprising:
    installing an executable custom client authenticator on non-server entity, wherein the custom client authenticator authorizes communication between a client application of a client and requested entities of a server and wherein a native authentication technology for the client is different than a native authentication technology for the server;
    registering the custom client authenticator, that is installed and performs on the non-server entity, in a descriptor file that is accessible by the server;
    generating, performed at the custom client authenticator on the non-server entity, an authorization token for the client;
    transmitting the authorization token as part of a request message for the client application to the server;
    validating, performed at the custom client authenticator on the non-server entity, the authorization token on behalf of the server; and
    forwarding the request message to the requested entities executing on the server based on the validating.

2. The method as recited by claim 1, wherein the custom client authenticator uses a token technology.

3. The method as recited by claim 1, wherein the method further comprises:
    providing, in the system, a plurality of custom client authenticators for a plurality of clients; and
    providing, in the system, a one-to-one association between the custom client authenticators and the clients.

4. The method as recited by claim 1, wherein the system includes a second client that has the native authorization technology of the server and wherein the method further comprises:
    using the native authorization technology of the server for communication between a second client application on the second client that has the native authorization technology of the server.

5. The method as recited by claim 1, wherein the method further comprises:
    installing different custom client authenticators for two clients that use different types of token technology.

6. The method as recited by claim 1, wherein the non-server entity is selected from the client and a shared library.

7. The method as recited by claim 1, wherein the registering further comprises:
    registering the custom client authenticator in the descriptor file via an authentication class.

8. The method as recited by claim 1, wherein the registering further comprises:
    using an authenticator name parameter and an authenticator handler parameter to register the custom client authenticator.

9. The method as recited by claim 1, wherein the method further comprises:
    generating a second token with a user name and credentials;
    comparing the authorization token with the second token; and
    determining whether the custom client authenticator is registered based on the comparing.

10. The method as recited by claim 1, wherein the method further comprises:
    executing the custom client authenticator on the non-server entity;
    generating a confirming token that confirms the client application sent the request message with the authorization token;
    validating the authorization token by comparing the authorization token with the comparing token;
    based on the validating, setting identity of the client application; and
    selectively forwarding request messages from the client application to the requested entities on the server that require validation of the authorization token.

11. A non-transitory computer-readable storage medium carrying program instructions thereon for providing intercommunication within a system that uses disparate authentication technologies, the instructions executable when executed by one or more processors cause the one or more processors to perform operations of a method comprising
    installing an executable custom client authenticator on non-server entity, wherein the custom client authenticator authorizes communication between a client application of a client and requested entities of a server and wherein a native authentication technology for the client is different than a native authentication technology for the server;

registering the custom client authenticator, that is installed and performs on the non-server entity, in a descriptor file that is accessible by the server;

generating, performed at the custom client authenticator on the non-server entity, an authorization token for the client;

transmitting the authorization token as part of a request message for the client application to the server;

validating, performed at the custom client authenticator on the non-server entity, the authorization token on behalf of the server; and forwarding the request message to the requested entities executing on the server based on the validating.

12. The non-transitory computer-readable storage medium as recited by claim 11, wherein the custom client authenticator uses a token technology.

13. The non-transitory computer-readable storage medium as recited by claim 11, wherein the method further comprises:

providing, in the system, a plurality of custom client authenticators for a plurality of clients; and providing, in the system, a one-to-one association between the custom client authenticators and the clients.

14. The non-transitory computer-readable storage medium as recited by claim 11, wherein the method further comprises:

using native authorization technology of the server for communication between a second client application on a second client that has the native authorization technology of the server.

15. The non-transitory computer-readable storage medium as recited by claim 11, wherein the method further comprises:

installing different custom client authenticators for two clients that use different types of token technology.

16. The non-transitory computer-readable storage medium as recited by claim 11, wherein the non-server entity is selected from the client and a shared library.

17. The non-transitory computer-readable storage medium as recited by claim 11, wherein the registering further comprises:

registering the custom client authenticator in the descriptor file via an authentication class.

18. The non-transitory computer-readable storage medium as recited by claim 11, wherein the method further comprises:

generating a second token with a user name and credentials;

comparing the authorization token with the second token; and determining whether the custom client authenticator is registered based on the comparing.

19. The non-transitory computer-readable storage medium as recited by claim 11, wherein the method further comprises:

executing the custom client authenticator on the non-server entity;

generating a confirming token that confirms the client application sent the request message with the authorization token;

validating the authorization token by comparing the authorization token with the comparing token;

based on the validating, setting identity of the client application; and selectively forwarding request messages from the client application to the requested entities on the server that require validation of the authorization token.

20. An apparatus for providing intercommunication within a system that uses disparate authentication technologies, the apparatus comprising:

one or more processors; and logic encoded in one or more non-transitory computer-readable storage media for execution by the one or more processors and when executed operable to perform operations of a method comprising:

installing an executable custom client authenticator on non-server entity, wherein the custom client authenticator authorizes communication between a client application of a client and requested entities of a server and wherein a native authentication technology for the client is different than a native authentication technology for the server;

registering the custom client authenticator, that is installed and performs on the non-server entity, in a descriptor file that is accessible by the server;

generating, performed at the custom client authenticator on the non-server entity, an authorization token for the client;

transmitting the authorization token as part of a request message for the client application to the server;

validating, performed at the custom client authenticator on the non-server entity, the authorization token on behalf of the server; and forwarding the request message to the requested entities executing on the server based on the validating.

* * * * *